United States Patent [19]

Popovich

[11] Patent Number: 4,960,231
[45] Date of Patent: Oct. 2, 1990

[54] FISH STRINGING SYSTEM

[76] Inventor: Eric S. Popovich, 1516 Viscaya Dr., Port Charlotte, Fla. 33952

[21] Appl. No.: 362,254

[22] Filed: Jun. 6, 1989

[51] Int. Cl.⁵ .............................................. A01K 65/00
[52] U.S. Cl. .................................... 224/103; 224/253
[58] Field of Search ....................... 224/103, 253, 252; 24/3 M

[56] References Cited

U.S. PATENT DOCUMENTS

| | | | |
|---|---|---|---|
| 730,566 | 6/1903 | Pilcher | 24/3 M |
| 927,840 | 7/1909 | Dineen | 224/103 |
| 2,442,472 | 6/1948 | Sagan | 224/103 |
| 2,519,528 | 8/1950 | Williamson . | |
| 2,760,700 | 8/1956 | Lien . | |
| 2,812,125 | 11/1957 | Mercer | 224/103 |
| 3,371,830 | 3/1968 | Parkman . | |
| 3,387,753 | 6/1968 | Bowman . | |
| 4,830,244 | 5/1989 | Brannon | 224/103 |

Primary Examiner—Linda J. Sholl
Attorney, Agent, or Firm—Dominik, Stein, Saccocio, Reese, Colitz & Van Der Wall

[57] ABSTRACT

A fish string system comprising two assemblies, a fish stringing assembly, and an attachment assembly. The fish stringing assembly can be coupled or uncoupled with respect to the attachment assembly with one hand for checking the condition of the caught fish while allowing the fisherman to continue to operate the fishing rod with the other hand.

6 Claims, 2 Drawing Sheets

FISH STRINGING SYSTEM

BACKGROUND OF THE INVENTION

This invention relates to a fish stringing system, and more particularly, to a fish stringing system comprising two assemblies, a fish stringing assembly, and an attachment assembly. The fish stringing assembly can be coupled or uncoupled with respect to the attachment assembly with one hand for checking the condition of the caught fish while allowing the fisherman to continue to operate the fishing rod with the other hand. The system maintains the caught fish in a safe, live and fresh condition when deployed below the surface of the water.

DESCRIPTION OF THE BACKGROUND ART

Fish stringing devices for retaining caught fish in a safe, live and fresh condition underneath the water are well-established. Most of the devices are constructed whereby one end may be secured to a fixed object in a boat or a bridge while the other end may freely extend below the water line for retaining the fish all while the fisherman continues to catch fish. All of the previous devices for fish stringing require the fisherman to use both hands when checking the status of the caught fish. This interferes with the continued operation of the fishing rod, and consequently, decreases his opportunities to catch additional fish.

Various approaches are disclosed in the prior art for stringing fish. By way of example, in U. S. Pat. No. 3,371,830, Parkman discloses a fish stringing device with a tapered point on one end of the flexible line and a flexible, relocatable fish retention bar on the other end of the flexible line.

A fish stringer with a metallic line is disclosed in U.S. Pat. No. 3,387,753 to Bowman. In Bowman, a needle attachment is at one end for piercing the fish and a metallic pivotable fish retention bar is on the other end thereof.

U.S. Pat. No. 3,760,700 issued to Lien discloses a fish stringer with a flexible line having both ends adapted for fish piercing and fish retention and the Lien patent also discloses a fastener element for attachment in a conventional snap hook manner.

Williamson in U.S. Pat. No. 2,519,528 discloses a fish stringing device having a flexible line with one end adapted for piercing the fish and the other end comprising a fish retention bar and a fish scaling bar, all in one. U.S. Pat. No. 927,840 issued to Dineen discloses a fish stringer with a flexible line having one end adapted for piercing the fish and the other end adapted to receive a flexible fish retention bar.

Although many such advances are noteworthy to one extent or another, none achieves the objectives of a superior fish stringing system designed to accommodate the needs of a wide variety of fishing situations. As illustrated by the great number of prior patents and known fish stringing techniques, efforts are continuously being made in an attempt to develop fish stringing systems which are more efficient, reliable and convenient to manufacture and use. None of these previous efforts, however, provide the benefits attendant with the present invention. Additionally, prior fish stringing devices do not suggest the present inventive combination of component elements arranged and configured as disclosed and claimed herein. The present invention achieves its intended purposes, objects and advantages over the prior art devices through a new, useful and unobvious combination of component elements, with the use of a minimum number of functioning parts, at a reasonable cost to manufacture, and by employing only readily available materials.

Therefore, it is an object of this invention to provide an improved fish stringing system attachable to a fisherman or the like for retaining caught fish. The system comprises a fish stringing assembly including a length of flexible line. The flexible line has a first loop on a first end and a second loop on a second end remote from the first end. The fish stringing assembly also includes a fish stringing bar having a pointed end adapted for piercing the caught fish and threading the fish along the line. The fish stringing bar also has a single aperture for receiving the first loop of the line for allowing radial pivotal rotation of the fish stringing bar about the aperture when piercing the caught fish and when initially threading the fish along the line. The fish stringing assembly also includes a fish retention bar for retaining the first threaded fish against the retention bar and serially storing each subsequently caught fish on the line while in contiguous contact with the previously caught and threaded fish. The retention bar also has a pair of apertures adapted for receiving the second loop of the line in a perpendicular relationship to preclude movement of the threaded and caught fish off of the line. The system also includes an attachment assembly including a rigid attachment ring and a cord having a first end for coupling to the fisherman or the like and a second end remote therefrom for coupling to the attachment ring. The attachment ring has a fixed passage diameter sufficient for allowing unencumbered passage of the stringer bar and the length of line while the stringer bar is pivotally disposed in a parallel relationship to the length of line.

It is also an object of the invention to provide a new and improved fish stringing system that will keep the caught and threaded fish in a safe, fresh and live condition while the fisherman attempts to catch additional fish.

It is a further object of the invention to develop a fish stringing system that precludes the possibility of a threaded fish from escaping and swimming away.

It is a still further object of the invention to allow the fisherman to easily attach and detach a fish stringing assembly to and from an attachment assembly with only one hand, thereby allowing the fisherman to continue to operate the fishing rod with the other hand.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into an improved fish stringing system for retaining caught fish and attachable to a fisherman or the like. The system comprises a fish stringing assembly having a retention bar, a fish stringing bar for piercing the mouth and gills of the caught fish and a length of flexible line therebetween for threading each caught fish. The flexible line has a first end pivotally attached to the fish stringing bar through a single hole at about the midpoint, the line further having a second end remote thereof attached to the retention bar through a pair of axially aligned holes for storing the first threaded fish against the retention bar and serially storing each subsequently threaded fish on the line while in contiguous contact with the previously stored threaded fish. The retention bar is disposed perpendicularly to a longitudinal axis of the line for precluding passage of the threaded fish. The system also comprises an attachment assembly having a rigid attachment ring and cord with a first end for coupling to the fisherman or the like, and a second end remote therefrom for coupling to the rigid attachment ring. The rigid attachment ring is of a size sufficient for allowing unencumbered passage of the stringing bar and the length of line only while the stringer bar is pivotally disposed in a parallel relationship to the length of line.

The invention may also be incorporated into an improved fish stringing system attachable to a fisherman or the like for retaining caught fish. The system comprises a fish stringing assembly including a length of flexible line. The flexible line has a first loop on a first end and a second loop on a second end remote from the first end. The fish stringing assembly also includes a fish stringing bar having a pointed end adapted for piercing the caught fish and threading the fish along the line The fish stringing bar also has a single aperture for receiving the first loop of the line for allowing radial pivotal rotation of the fish stringing bar about the aperture when piercing the caught fish and when initially threading the fish along the line. The fish stringing assembly also includes a fish retention bar for retaining the first threaded fish against the retention bar and serially storing each subsequently caught fish on the line while in contiguous contact with the previously caught and threaded fish. The retention bar also has a pair of apertures adapted for receiving the second loop of the line in a perpendicular relationship to preclude movement of the threaded and caught fish off of the line. The system also includes an attachment assembly including a rigid attachment ring and a cord having a first end for coupling to the fisherman or the like and a second end remote therefrom for coupling to the attachment ring. The attachment ring has a fixed passage diameter sufficient for allowing unencumbered passage of the stringer bar and the length of line while the stringer bar is pivotally disposed in a parallel relationship to the length of line.

The fish stringing bar and the retention bar are made of an essentially rigid rust resistant material. The fish stringing bar and the retention bar are of identical constructions except for the point on one end of the stringing bar and the number of holes. The length of flexible line is made of a monofilament plastic material. The flexible line has a diameter of about ¼ inch to ½ inch. The flexible line has a test tensile strength of about 250 to 350 lbs. per square inch test.

The foregoing has outlined rather broadly the more pertinent and important features of the present invention in order that the detailed description of the invention that follows may be further understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other apparatus for carrying out the same purposes of the present invention. It should also be realized by those skilled in the art that such equivalent apparatus does not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar numbers refer to similar parts throughout the various Figures.

DETAILED DESCRIPTION OF THE INVENTION

Figure 1:
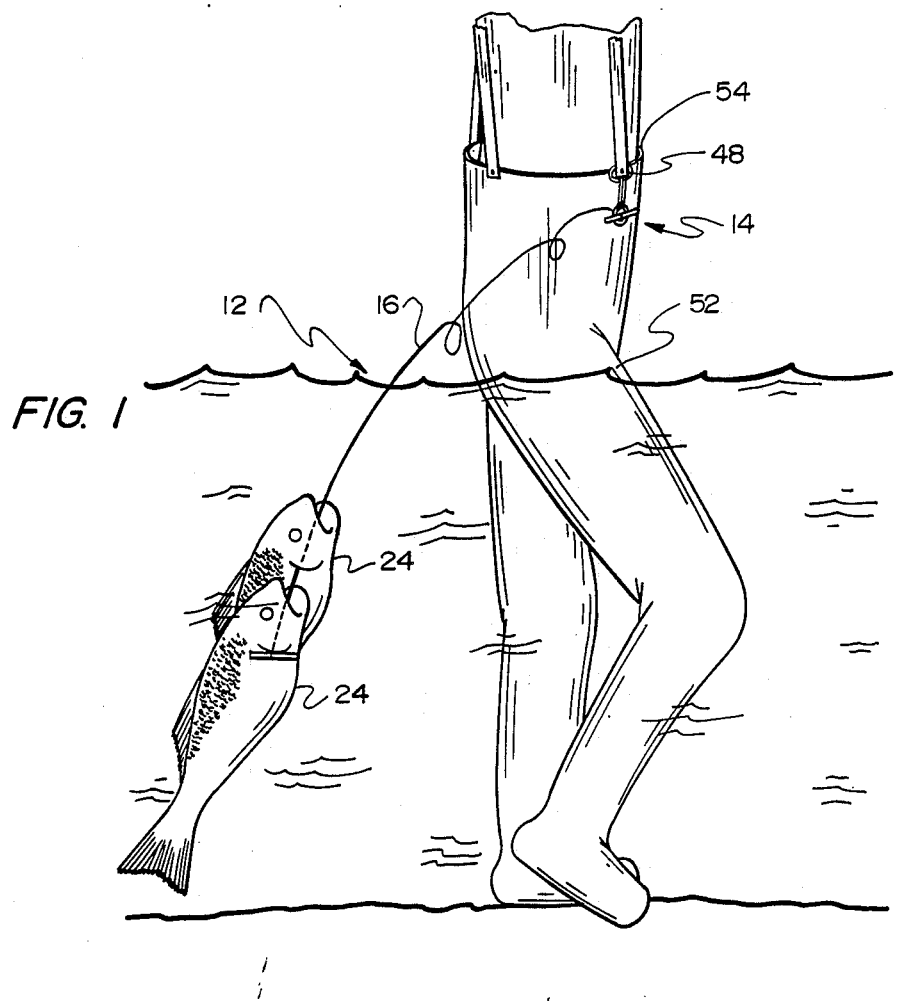
FIG. 1 is a perspective illustration showing the fish stringing system comprising an attachment assembly attached to a fisherman and a fish stringing assembly coupled to the attachment assembly.
Figure 2:
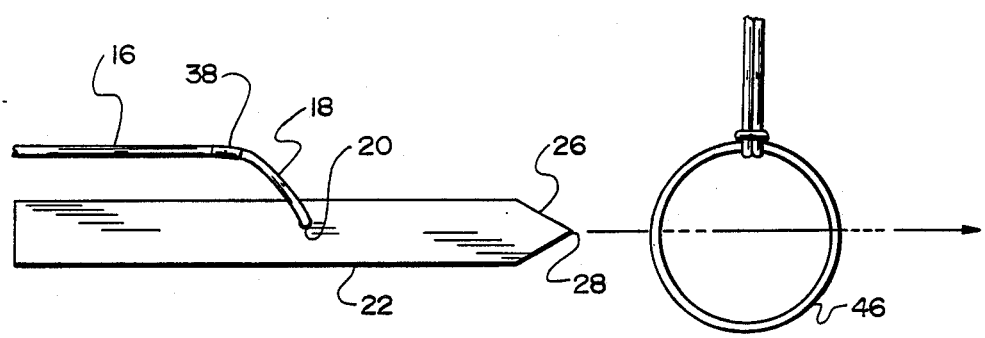
FIG. 2 is an illustration showing two components of the fish stringing assembly, a fish stringing bar and a flexible line, in a parallel relationship, in anticipation of the fish stringing bar passing through the fixed passage diameter of a rigid attachment ring of the attachment assembly.

The preferred embodiment of the invention comprises a fish stringing system 10 which includes a fish stringing assembly 12 and an attachment assembly 14. As shown in FIG. 1, the system is coupled to the fisherman during operation and use. FIG. 2 shows the system in anticipation of being coupled.

The fish stringing assembly 12 has a length of flexible line 16 with a terminal loop 18 on a first end 20. This end is adapted to engage the fish stringing bar 22 in pivotal relationship for allowing the fish stringing bar to pierce the gills and mouth of the caught fish 24 and thread the caught fish along the flexible line. The fish stringing bar 22 has an end 26 tapered to a point 28 to allow an easy passage through the gills and mouth or other part of the caught fish. The flexible line has a second terminal loop 32 on a second end 34 remote from the first end. This end is adapted to engage a fish retention bar 36 in an essentially normal or perpendicular relationship for cooperative engagement with the first threaded and caught fish. Both terminal loops are formed and maintained by a metallic clip 38 or other suitable means.

The flexible line is readily constructed of any material, size, weight, strength, etc. It is preferably a monofilament synthetic line such as nylon having a diameter of from about ¼ to about ½ inch with a test tensile strength of from 250 to 350 lbs. per square inch test.

The attachment assembly 14, the second part of the system, comprises a cord 42 with an end 44 adapted for coupling to a rigid attachment ring 46 and a second end remote therefrom for attachment to the fisherman, or the like.

The fisherman is depicted in FIG. 1 in conventional wading boots for stream fishing in fresh water or surf fishing in salt water. In the alternative, the invention can be attached to a cleat or other fixed object on a boat or a bridge or a dock should the fisherman be engaged in one of those modes of fishing. Regardless of the embodiment or mode used, the caught and threaded fish remain in a fresh and live condition below the surface of the water while the fisherman attempts to catch additional fish.

Figure 3:
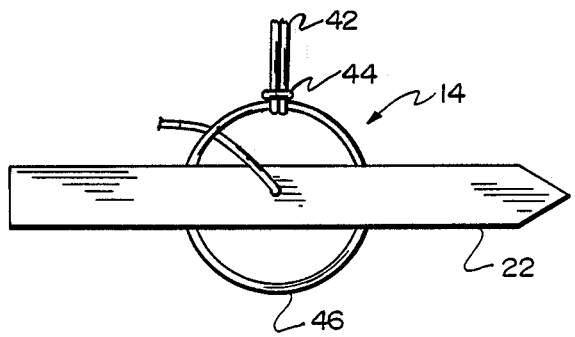
FIG. 3 is an illustration of the fish stringing bar, flexible line and attachment ring in an operative relationship after the fish stringing bar is inserted through the rigid attachment ring.
Figure 4:
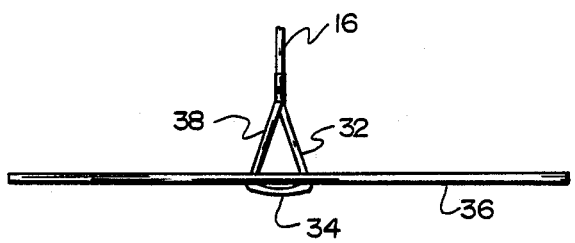
FIG. 4 is an elevational view of the flexible line in operative relationship with the third and final component of the fish stringing assembly, the fish retention bar, and showing the engagement of the metallic clip with the flexible line for forming a terminal loop through and about the fish retention bar.
Figure 5:
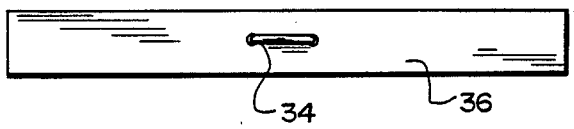
FIG. 5 is a bottom view of FIG. 4 showing the location of the paired apertures in the fish retention bar and the engagement of the terminal loop through the apertures and about the fish retention bar.

The rigid attachment ring 46 has a fixed passage diameter for allowing unencumbered passage of the fish stringing bar 22. The fisherman 52 couples an end of the cord to the attachment ring and the second end to his apparel 54 or the like. The fisherman then passes the fish stringing bar through the passage diameter of the rigid attachment ring, rotates the fish stringing bar into a perpendicular relationship with the flexible line as best illustrated in FIG. 3 and releases the fish stringing bar. A non-illustrated fishing rod is operated by the fisherman after the attachment of the invention to his person or the like.

As best illustrated in FIG. 2, the fish stringing bar 22 is disposed in an essentially parallel relationship with the flexible line 16 and inserted through the rigid attachment ring 46. The fisherman then rotates the fish stringing bar to an approximately perpendicular relationship to the flexible line and releases his grip on the fish stringing bar. The fish stringing bar, the flexible line and the rigid attachment ring are then disposed in a relationship best shown in FIG. 3. The fish stringing bar has a length from the center to either end which is greater than the passage diameter of the rigid attachment ring for allowing the fish stringing bar to repose against the rigid attachment ring in a perpendicular relationship after the fisherman rotates and releases the fish stringing bar.

The invention can be operated by one hand of a fisherman. That is, the fish stringing bar can be engaged and disengaged from the rigid attachment ring with one hand. This important feature of the invention allows the fisherman to disengage the fish stringing bar from the rigid attachment ring and then reengage the fish stringing bar with the rigid attachment ring. This feature thus allows the fisherman to inspect the condition of the live threaded and caught fish while allowing the other hand to maintain operation of the non-illustrated fishing rod during the disengagement/ re-engagement cycle.

The fish retention bar 36 has a pair of apertures 58 and 60 along its axis adapted to receive the second terminal loop of the flexible line in an essentially perpendicular relationship to oppose or preclude motion of the first threaded and caught fish after engagement with the retention bar. The first threaded caught fish serves as a retainer for opposing motion of the second and subsequent caught fish after such second and subsequent caught fish are threaded along the flexible line into a position contacting the prior caught and threaded fish. The process of inserting the fish stringing bar and threading the fish is repeated for each caught fish. Each threaded and caught fish serves as a retainer for the subsequently caught and threaded fish.

The pair of apertures 58 and 60 in the fish retention bar 36 ensures the proper orientation of bar to line in this region. This is in contrast to the single aperture 64 in the center of the fish stringing bar 22 wherein the bar may be oriented parallel with the line during threading of a fish or during coupling/uncoupling of the stringing assembly with respect to the coupling assembly.

The fish stringing bar 22 and retention bar 36 are preferably fabricated of a rigid, non-corrosive material such as aluminum, brass or plastic. They are of a common size and shape except for the point at one end of the retention bar for fish piercing purposes and except for the number of apertures for receiving the loops of the line.

In use and operation, the tapered end of the fish stringing bar 22 is inserted in the gills of the first caught fish 24 and passed out through the mouth. The caught fish is then threaded along the flexible line 16 until the fish retention bar 36 cooperatively engages the body of the fish in a normal relationship and precludes subsequent motion of the first threaded and caught fish along the flexible line. The first threaded and caught fish is firmly engaged with the fish retention bar and subsequently caught fish are firmly engaged in a cooperative relationship with the previously threaded and caught fish. The threaded and caught fish can be safely allowed back in the water to keep it fresh for eating and without fear of the threaded and caught fish swimming away.

The fish retention bar 36 can stay beneath the surface of the water indefinitely while the latest caught fish is threaded along the flexible line. This important feature of the invention allows the previously caught and threaded fish to stay below the surface of the water in a live and fresh condition while the latest caught fish is threaded along the flexible line into a position of cooperative engagement with the previously caught and threaded fish.

The invention is put into operative status with two easy motions. First, the fisherman couples the end of the cord to his person or a fixed object and the other end of the cord to the attachment ring. With the fish stringing bar parallel with the line, the fisherman then passes the fish stringing bar through the inner passage diameter of the rigid attachment ring, rotates the fish stringing bar into a normal or perpendicular relationship with the flexible line and releases the fish stringing bar.

The invention is then in an operative status and the fisherman is now poised to commence fishing. The fish stringing bar 22 is elongated and has a length from the center to each end greater than the inner passage diameter of the rigid attachment ring 46 for precluding an unintended detachment of the fish stringing assembly from the attachment assembly.

The fisherman may at any time release one hand from the non-illustrated fishing pole and detach the fish stringing assembly from the attachment assembly for purposes of checking the condition of the previously caught and threaded fish.

The uncoupling is effected by pivoting the fish retaining bar parallel with the line and inserting it through the ring.

The fish retention bar 36 is designed to maintain a continuous approximately normal or perpendicular relationship with the flexible line 16 to preclude the possibility of a caught and threaded fish from sliding off of the flexible line and swimming away. Each subsequently caught fish 24 is serially threaded along the line 16 until it comes into cooperative engagement with the previously caught and threaded fish. The process can be repeated indefinitely or until the entire line 16 is full of fish. The line is of any length so as to retain the threaded fish underwater live and fresh for eating.

While the present invention has been described with respect to a particular embodiment, it is not intended to be so limited. It is intended to be protected broadly within the spirit and scope of the invention.

Now that the invention has been described,

What is claimed is:

1. A fish stringing system attachable to a fisherman for retaining caught fish comprising in combination:

a fish stringing assembly including a length of flexible line, the line having a first loop on a first end and a second loop on a second end remote from the first end, a fish stringing bar comprising a plate having a pointed end adapted for piercing the caught fish and threading the fish along the line, the fish stringing bar having a single centrally located aperture through said plate receiving the first loop of the line for allowing radial pivotal rotation of the fish stringing bar about the aperture when piercing the caught fish and when initially threading the fish along the line, and a fish retention bar for retaining the first threaded fish against the retention bar and serially storing each subsequently caught fish on the line while in contiguous contact with the previously caught and threaded fish, the retention bar having a pair of longitudinally aligned apertures adapted for receiving the second loop of the line in a perpendicular relationship to preclude movement of the threaded and caught fish off of the line; and an attachment assembly including a rigid attachment ring and a cord having a first end for coupling to the fisherman or the like and a second end remote therefrom for coupling to the attachment ring, the attachment ring having a fixed passage diameter sufficient for allowing unencumbered passage of the stringer bar and the length of line while the stringer bar is pivotally disposed in a parallel relationship to the length of line.

2. A fish stringing system as recited in claim 1 wherein the fish stringing bar and the retention bar are made of an essentially rigid rust resistant material.

3. The fish stringer system as recited in claim 1 wherein the fish stringing bar and the retention bar are of identical constructions except for the point on one end of the stringing bar and the number of holes.

4. A fish stringing system as recited in claim 1 wherein the length of flexible line is made of a monofilament plastic material.

5. A fish stringing system as recited in claim 1 wherein the flexible line has a diameter of about 1/4 inch to ½ inch.

6. A fish stringing system as recited in claim 5 wherein one flexible line has a test tensile strength of about 250 to 350 lbs. per square inch test.

* * * * *